Patented Aug. 15, 1950

2,519,034

UNITED STATES PATENT OFFICE 2,519,034

LOW TEMPERATURE POLYMERIZATION OF MIXED OLEFINS WITH Al₂ClBr₅ CATALYST

Norman M. Elmore, Elizabeth, and David W. Young, Roselle, N. J., assignors to Standard Oil Development Company, a corporation of Delaware No Drawing. Application September 7, 1944, Serial No. 553,112

9 Claims. (Cl. 260—85.3)

This invention relates to olefinic polymers; relates especially to the polymerization of mixed olefinic material; and relates particularly to the production of narrow range polymers of mixed olefinic material by the use of a hydrocarbon soluble polymerization catalyst.

It has been found possible to polymerize isobutylene at temperatures ranging from the boiling point of isobutylene down to about −165° C. by the use of Friedel-Crafts type catalysts such as boron trifluoride, aluminum chloride and the like, but great difficulty has been encountered in getting satisfactory yields of polymer, and yields of polymer in which the distribution of molecular weight has been satisfactory, and it has been found that other olefins than isobutylene exerted a very profound poisoning effect upon the catalyst, resulting in the production of polymers having molecular weights below those desired and molecular ranges much broader than those desired. Many attempts have been made to polymerize a "C₄ cut" to obtain polymers of good thickening and viscosity raising powers when dissolved in lubricating oil, but great difficulty has been encountered because of the presence in the C₄ cut of larger amounts of normal butylenes than of isobutylene, the normal butylenes showing a severe poisoning effect on the catalyst and resulting in undesirably low molecular weights. That is, polymers having molecular weights within the range from dimer to tetramer, that is, C₈ to C₁₆ compounds, are practically without thickening effect upon a lubricating oil and are wholly without effect upon the viscosity index of a lubricating oil. Accordingly, since their lubricating power also tends to be low, they are undesirable in a lubricating oil, and require an expensive purification step to remove them from the polymer.

According to the present invention it was found that by the use of a special catalyst it is possible to polymerize the ordinary refinery "C₄ cut" to yield a high grade olefinic polymer which, depending upon the temperature of polymerization, character and contents of the C₄ cut and catalyst condition, may be a polymer of isobutylene or may be in part a polymer of isobutylene, a copolymer of isobutylene and normal butylenes; and may contain portions of a polymer of normal butylenes; which in spite of the presence of normal butylenes in the C₄ cut contains much less of the C₈ to C₁₆ polymers. In addition the process of the invention produces a higher yield of polymer from the C₄ cut than is obtainable in any other way.

According to the present invention, a catalyst in the form of aluminum bromo chloride, preferably having the proportion of bromine and chlorine such as to indicate a formula of Al₂Br₅Cl, is found to be quite readily soluble in liquid butane and in the C₄ cut, and to be a very powerful but comparatively slow acting catalyst which is not seriously poisoned by the normal butylenes, but instead not only polymerizes the isobutylene but may interpolymerize isobutylene and normal butylene to yield a total amount of polymer which may amount to 200% or more of the isobutylene present, whereas all prior processes yielded an amount of polymer less than the amount of isobutylene present.

Thus, the process of the invention interpolymerizes a "C₄ cut" by the application thereto of an aluminum bromo chloride catalyst to yield an interpolymer of isobutylene and normal butylene having a minimum amount of dimer, trimer and tetramer present and a narrow range of molecular weights above the C₁₆ polymer, the molecular weight ranging from a molecular weight of 280 up to a molecular weight of about 6000 or higher, with the majority of the polymer molecules having a molecular weight between about 1500 and about 5000 (as determined by the Staudinger viscosity method), to yield a very efficient viscosity raising and viscosity index improving solute for lubricating oils and a narrow range polymer valuable for many other purposes. Other objects and details of the invention will be apparent from the following description.

Broadly, the invention consists in treating a Refinery C₄ cut, containing substantially only isobutylene, the normal butylenes, both alpha and beta butylene, isobutane and the normal butanes, with an aluminum halide catalyst containing both bromine and chlorine, which is soluble in butane.

A typical C₄ cut as obtained from the gaseous output of the cracking coils may consist of from 12 to 25% of isobutylene, from 20 to 50% of the normal butylenes, and the remainder isobutane and the normal butanes, with minor quantities only, to traces of propane, propylene, ethane, ethylene, and no more than traces, usually not any, methane or hydrogen. This material boils under atmospheric pressure at temperatures around 0° C., the range being from about −10° C. to +6° C., according to the proportion of the various ingredients present. It is desirable that the material be as free as possible from sulfur compounds which may be accomplished by such steps as treating the C₄ cut with caustic soda either in the form of flakes or in alcoholic solution, or even in water solution. It is preferable to remove the sulfur compounds by a non-aqueous treatment to avoid the necessity of subsequently drying the hydrocarbon material. Alternatively, however, the C₄ cut may be treated with a 16° Bé. solution of caustic soda which is saturated with litharge. This treatment while aqueous, is the most effective even though it requires a subsequent drying of the gas. Alternatively also, the so-called "Solutizer process" is also satisfactory and effective.

The catalyst is preferably aluminum bromo chloride, $Al_2Br_5Cl$, but other aluminum bromo chlorides may likewise be used, especially if the catalyst is used in butane solution, in which case only the $Al_2Br_5Cl$ is dissolved, leaving behind a residue of other, insoluble, aluminum salts of chlorine and bromine.

The reaction may be conducted at the temperature set by the atmospheric pressure boiling temperature of the mixture, or the temperature may be set at lower values by the use of a refrigerating jacket containing liquid butane or liquid propane or liquid ethane or even liquid ethylene or liquid methane, or other appropriate refrigerants; alternatively, the refrigerant may be included directly in the polymerization mixture by the inclusion in the reaction mixture of additional amounts of liquid butane or of appropriate amounts of propane, liquid or solid carbon dioxide, liquid ethane or even liquid ethylene, and occasionally liquid methane, although the liquid methane usually yields an undesirably low temperature. That is, the polymerization may be conducted at practically any temperature from about $+6°$ C. to $-164°$ C.

A preferred embodiment utilizes the $C_4$ cut as such. It is not necessary however for the polymerization reaction that the polymerization mixture contain only the $C_4$ cut since there may be added to it for refrigerant purposes such substances as propane or ethane; and it is found that the presence of propylene and ethylene does not interfere with the polymerization reaction. In some instances small amounts of propylene may also be polymerized or interpolymerized with other components of the $C_4$ cut. Similarly, the higher members of the series including the pentanes, the pentenes and even the hexanes and the hexenes may be present in substantial quantities. The pentanes and hexanes appear as merely inert diluents; the pentenes and hexenes may polymerize or interpolymerize.

The reaction may be conducted batchwise upon appropriate amounts of the $C_4$ cut in a suitable reactor. For this purpose the solid catalyst material may be added to the reactor, the $C_4$ cut with or without a refrigerant, the reactor being refrigerant jacketed or not as desired, the solid catalyst being vigorously stirred into the $C_4$ cut.

Alternatively, an appropriate amount of $C_4$ cut, with external or internal refrigerant as desired, may be placed in the reactor and the catalyst added to the rapidly stirred $C_4$ cut, either in the form of pulverized solid or in solution in liquid butane or propane or pentane or the like, as desired. Alternatively, the catalyst may be dissolved in residual $C_4$ cut, recovered from a previous polymerization.

The resulting polymer will contain no more than 5 or 6% of material within the $C_8$ to $C_{16}$ boiling range and may amount to from 125% to 250% of the amount of isobutylene present in the original $C_4$ cut, depending upon the temperature of the polymerization, the amount of catalyst and the ratio of isobutylene to normal butylene in the $C_4$ cut. The polymer obtained is readily purified to yield a nearly white or very light amber color product of excellent solubility in petroleum hydrocarbons generally and an excellent thickening and viscosity index improved effect in lubricating oils.

The material is particularly valuable as a "tackifier" to increase the "tack" or stickiness of both natural and synthetic rubber substances; and to improve the compounding, processing and assembling of rubber articles. The polymer also is an excellent softener and processing aid for both natural and synthetic rubbers. The polymer is particularly valuable as a non-fouling lubricant which is especially valuable for rolling or drawing aluminum and stainless steel; especially for the production of sheets or stampings of very thin gauge. Under the heat developed in the course of rolling or drawing, the polymer does not yield a carbonaceous residue. Being a polymer of the lower olefins which are gaseous at the ordinary temperatures, depolymerization yields only gaseous residues and accordingly when the polymer is used as a rolling lubricant, for which it is very effective, it provides the necessary lubricant between the rolls and the sheet aluminum to prevent sticking of the aluminum to the rolls or flaking or other damage and such portions of the lubricant as is unavoidably destroyed by the heat from the rolling operation, are volatilized and leave no residue behind. Polymers of the higher molecular weight portions of the polymerization are particularly valuable as adhesives in the shoe industry; and as binders for orchard or plant insecticide sprays. The polymers are particularly useful for mixing with higher molecular weight polybutylene, such as may be prepared by the polymerization of pure isobutylene at very low temperatures by boron trifluoride to yield polymers having molecular weights from 25,000 up to 500,000, since they very greatly increase the adhesiveness of these polymers when used for masking tapes, "Scotch tape," surgical adhesives and the like. These polymers are particularly good as insulating materials, especially insulating oils for transformer or cable service since they have excellent di-electric constants and very low di-electric losses, and in addition have unusually high breakdown voltages. They are particularly valuable in high-frequency condensers and transformers because of their excellent electrical characteristics in the presence of radio frequency, particularly ultra-high radio frequencies; and they are particularly valuable for fluid insulation material in "radar" equipment because of their combination of good di-electric strength, low di-electric loss properties and very low hydrogroscopic tendencies.

The following examples show the preferred methods of practicing the invention:

*Example 1*

A $C_4$ cut having the following components was utilized:

| | |
|---|---|
| Isobutylene | 16.8 |
| Normal butylenes | 32.0 |
| Saturated butanes ____per cent__ | 51.2 |
| Total sulfur (lamp method) grams per 100 cu. ft.__ | 7.4 |

This analysis is accurate to one decimal place, but does not take into account the presence of traces of a considerable number of other substances, present in amounts less than $\frac{1}{10}$%; many of which are, by the analytic method, grouped with the substances which are present in major proportion.

900 parts by weight of this $C_4$ cut were placed in a reactor equipped with a good stirrer and 25 parts by weight of pulverized $AlBr_2Cl$ were added. A vigorous reaction started immediately, boiling out a substantial portion of the normal butane. The starting temperature of the polymerization of this material at atmospheric pressure was approximately 0° C. and at the close of the reaction the final temperature was approximately +5° C. When the reaction had subsided an additional 1800 parts by weight of the same $C_4$ cut were added in a small but steady stream such as to give a continuing but controlled reaction. When the 1800 parts of additional $C_4$ had been added, the reaction had then become definitely slow, showing that the catalyst was nearly exhausted. The material was allowed to settle briefly, and the polymer, in solution in residual butane, was decanted from undissolved catalyst and a substantial amount of butane insoluble sludge. The butane was then evaporated from the polymer solution and the polymer obtained was washed with a 10% alcoholic caustic solution. The yield of polymer was approximately 600 parts by weight upon a feed of 2700 parts by weight of $C_4$ cut. This amounted to a yield of 22.2% compared to an amount of isobutylene of 16.8% in the $C_4$ cut. The polymer was then steam stripped to a flash point of 325° F. to remove the light portions boiling in the $C_8$ to $C_{16}$ range. 5.7% of the polymer was removed by this process. The Furol viscosity at 210° of the product was found to be 69. Approximately 22-23% of the total $C_4$ cut used was polymerized. This amounted to 132% of the isobutylene present, and amounted to 45% of the total olefins present, as is shown in the subjoined table.

Example 2

25 parts by weight of solid $AlBr_2Cl$ were placed in a reactor equipped with a good stirrer and there were then added slowly and continuously approximately 3600 parts by weight of the $C_4$ cut. Polymerizaton started immediately and continued actively but was controlled by the rate of addition of the $C_4$ cut so that the boiling liquid did not overflow the reactor. When the 3600 parts by weight had been added it became evident that the end of the useful life of the catalyst was being approached. The stirrer was then withdrawn and the solution allowed to settle briefly and then the polymer solution in butane was decanted from the insoluble portion of the catalyst and portions of butane insoluble sludge. The butane was then volatilized out, leaving approximately 1250 grams of polymer, amounting to 34.7% of the $C_4$ cut used.

The crude polymer was steam stripped to a flash point of 350° F. to remove light portions boiling in the $C_8$ to $C_{16}$ range. Approximately 5.4% of the total polymer product was removed by this procedure. The remaining polymer was then dissolved in 54° naphtha and treated with "Superfiltrol" clay fines at the boiling point of the naphtha (approximately 90° C.). The mixture was then cooled and filtered to remove the clay and colorant material. The solution was water-white, substantially all of the colorant materials having been absorbed by the active clay. The naphtha was then evaporated out from the polymer, leaving the polymer in the form of a heavy, viscous oil having a faint amber color.

Example 3

3600 parts by weight of liquid propane were treated with $AlBr_2Cl$ until a saturated solution of catalyst was obtained. Subsequent tests showed that this was a saturated solution of $Al_2Br_5Cl$ and the residue contained considerable amounts of insoluble $AlBrCl_2$. To this solution, at a temperature of approximately −30° C., there were then added 3600 parts by weight of refinery $C_4$ cut, the $C_4$ cut being added slowly and stirred into the catalyst solution vigorously, so that the temperature was maintained at about −30° C. The reaction started relatively slowly, and in order to increase the reaction rate, approximately 25 parts by weight of solid, pulverized $AlBr_2Cl$ were added to the reaction mixture in the beaker. The presence of this excess of solid catalyst substantially increased the reaction speed. When the full amount of $C_4$ cut had been added and the reaction completed the stirrer was removed and the mixture allowed to settle briefly. The polymer solution in mixed butane and propane was then decanted from the solid catalyst and insoluble sludge, and the propane and butane evaporated. Approximately 1200 parts by weight of crude polymer were obtained showing a yield of 33.3%. A portion of the crude polymer was then steam stripped to a flash point of 350° F. to remove the lighter portion boiling within the $C_8$ to $C_{16}$ range. This material was found to amount to 4.9%. The remainder of the crude polymer was then dissolved in 54° naphtha and portions were given various treatments to determine the best purification procedure.

A first portion of the naphtha solution was washed with alcoholic caustic solution and then washed with water until it was neutral to litmus. Volatilization of the naphtha followed by steam stripping of the naphtha gave a dark amber polymer product.

A second portion of the naphtha solution was treated with superfiltrol clay at the boiling point of the naphtha (approximately 90° C.), the naphtha solution was cooled and filtered to remove the clay. The polymer solution was then evaporated to remove the naphtha and the residue was steam stripped to a flash temperature of approximately 350° F. The resulting polymer product was water white.

A third portion of the polymer solution was evaporated to remove the naphtha, steam stripped and then treated with superfiltrol clay at 250° F., then filtered. The product was a medium amber in color.

The product obtained from the clay treatment at 200° F. was then treated with 95% sulfuric acid. It was found that the polymer oil reacted with the acid, giving a highly discolored, black polymer.

Example 4

Approximately 1200 parts by weight of $C_4$ cut were placed in a reactor, and approximately 300 parts by weight of liquid butane containing 14.25 parts by weight of dissolved $Al_2Br_5Cl$ were added in small portions of the $C_4$ cut in the reactor, with vigorous stirring. The reaction began very slowly, and continued at a very slow rate until all of the catalyst solution had been added. Then the polymerization became so rapid and so violent as to cause such a vigorous boiling of the components that the reaction mixture could not be kept in the reactor and a considerable amount of the product was lost and, accordingly, no material balance could be obtained. When the reaction was completed, the residual reaction mixture was diluted with an equal part of butane and the solution treated with superfiltrol clay fines at the boiling point of the solvents, approximately −10° C. The material, after standing for approximately 30 minutes with vigorous stirring to keep the clay in suspension, was filtered and the butane evaporated off. The residual polymer was then steam stripped to a flash point of 400° F. and a water white polymer was obtained. This material had a Furol viscosity at 210° F. of 223. This example shows the effectiveness of polymerization by a catalyst dissolved in butane.

Example 5

For purposes of comparison, a similar polymerization was conducted with solid aluminum chloride. Approximately 50 parts by weight of finely powdered anhydrous aluminum chloride were placed in a reactor equipped with a good stirrer. Approximately 2400 parts by weight of $C_4$ cut were added to the reactor over a period of approximately 20 minutes. The reaction started immediately and the reaction temperature was found to lie between about 0° C. and +5° C. A considerable portion of the material was boiled out and at the end of the reaction enough butane was added to bring the total weight up to approximately 1200 parts. The butane solution of the polymer was decanted from sludge and residual catalyst and treated with superfiltrol clay fines, with vigorous stirring, for 30 minutes. The clay was then filtered out and the butane evaporated to leave a water white polymer amounting to 17.5% of the original $C_4$ cut. This material was steam stripped to a flash of 400° F. to remove the light polymers boiling in the $C_8$ to $C_{16}$ range. Approximately 10.50% was removed by this treatment. The resulting polymer had a Furol viscosity at 210 of 64. This example shows the much lower yield and much higher amounts of low boiling material produced by aluminum chloride.

Example 6

As another comparison experiment, approximately 50 parts by weight of finely powdered anhydrous aluminum chloride were placed in a reactor equipped with a good stirrer. Approximately 2400 parts by weight of $C_4$ cut diluted with 2400 parts of normal butane were added to the reactor in a slow stream over a period of 20 minutes. The reaction was very slow in starting, in comparison to the reaction in Example 5, but it eventually went substantially to completion. At the close of the reaction, the mixture was allowed to settle briefly and the solution of polymer in butane was decanted from the catalyst and sludge, and the butane evaporated. The yield of polymer on the $C_4$ cut amounted to 20.8%, showing the interpolymerization of a portion of the normal butylenes. The product was steam stripped to a flash point of 390° F. to remove the portion boiling in the $C_8$ to $C_{16}$ range. This material amounted to 15.0%. The Furol viscosity of the material at 210° F. was found to be 36.

Example 7

1200 parts by weight of $C_4$ cut were placed in a reactor and there were added 60 parts by weight of butane containing 6.9 parts by weight of dissolved $Al_2Br_5Cl$ at a very slow rate to the $C_4$ cut in the reactor, to prevent loss of polymer by excessive boiling. The first 30 parts of catalyst gave no substantial evidence of polymerization. As soon as 40 parts by weight of catalyst solution had been added, the reaction became very active and the addition of only a few additional drops of catalyst solution caused a violent reaction, as indicated by a very vigorous boiling of the contents of the reactor. Accordingly, the last portions of the catalyst were added almost dropwise. When the last of the catalyst solution had been added and the reaction was complete, the stirrer was removed and the material allowed to stand for about 3 minutes to settle out sludge and any precipitated catalyst. The polymerization material was then decanted to approximately 1200 parts by weight of butane and stirred vigorously with a substantial quantity of superfiltrol clay fines. The solution was then filtered to remove the clay and the butane was evaporated. The polymer amounted to approximately 16.9% of the $C_4$ cut, approximately 101.0% of the isobutylene present, and 34.7% of the total olefinic material. The polymer was then steam stripped to a flash point of approximately 460° F. This treatment removed less than 6% of the total polymer to yield a material having a Furol viscosity at 210 of 909. This also shows the superiority of $Al_2Br_5Cl$ dissolved in butane in making high viscosity polymer oils.

Example 8

Approximately 1200 parts by weight of $C_4$ cut were placed in a reactor and to it there were added 120 parts of butane containing 13.8 parts by weight of dissolved $Al_2Br_5Cl$. This material was added quite slowly and the reaction proceeded much as in Example 7 to yield a polymer from which less than 5% was removed by steam stripping to a flash point above 400° F. This material had a Furol viscosity at 210° F. of 266.

Example 9

A solution of 120 parts by weight of butane containing 13.8 parts by weight of dissolved $Al_2Br_5Cl$ was placed in the reactor and to it there was added approximately 1200 parts by weight of $C_4$ cut, the $C_4$ cut being added in a moderate sized stream, slowly enough to avoid boiling over of the reactor contents. This material was clay treated and steam stripped as before to remove the low boiling portions which amounted to somewhat less than 6% of the total polymer. This polymer showed a Furol viscosity at 210 of 134.

The results of these several examples are summarized in the following table:

*Summary of data on viscous oils made from $C_4$ cut*

| Run | Cat. | How Used | Per Cent on Polymer | Temp. | Yield | | | Flash | Furol Vis. @ 210 | Per Cent Light Ends on Polymer |
| --- | --- | --- | --- | --- | --- | --- | --- | --- | --- | --- |
| | | | | | On $C_4$ Cut | On Iso $C_4=$ | On Total Olefins | | | |
| | | | | °C. | Per cent | Per cent | Per cent | °F. | | |
| 167-27 | $AlBr_2Cl$ | Solid | Excess | 0 to +5 | 23 | 137 | 47 | 325 | 69 | 5.7 |
| 167-28 | do | do | do | 0 to +5 | 34.6 | 206 | 71 | 310 | 44 | 5.4 |
| 167-29 | do | $C_3$ Solution and Solid | do | −30 | 33.4 | 198 | 68 | 340 | 87 | 4.9 |
| 167-34 | do | Solution in Butane | | 0 to +5 | Lost by violent reaction | | | 435 | 223 | |
| 167-35 | $AlCl_3$ | Solid | Excess | 0 to 5 | 17.5 | 104 | 35.8 | 385 | 64 | 10.5 |
| 167-36 | do | do | do | 0 to +5 | 20.8 | 124 | 42.5 | 390 | 36 | 15.0 |
| 169-39-1 | $Al_2Br_5Cl$ | Butane Solution | 3.35 | 0 to +5 | 16.9 | 101 | 34.6 | 460 | 909 | <6 |
| 167-39-2 | do | do | 4.88 | 0 to +5 | 23.6 | 140 | 48.4 | >400 | 266 | <5 |
| 167-39-3 | do | do.¹ | | | 22.5 | 134 | 46.2 | >400 | 134 | <6 |

¹ $C_4$ cut added to catalyst solution.

This table shows that a very much superior yield is obtainable, or a markedly superior polymer is obtainable, or both, by the procedure of the present invention.

In order to determine the character of the catalyst which is soluble in butane, 125 grams of aluminum chloride bromide, $AlBr_2Cl$, were placed in a soxhlet extractor having a reflux condenser cooled by solid carbon dioxide. Liquid butane was used as the extracting solvent. The aluminum chloride bromide was extracted with liquid butane until no more of the solid would dissolve. The extract and the residue were then carefully dried and analyzed. The extract material gave analyses corresponding closely to $Al_2Br_5Cl$ and the insoluble material gave analyses corresponding closely to $AlBrCl_2$.

The analyses were as follows:

*Butane extract*

|  | Per Cent Found by Analysis | Per Cent Calculated from Formula $Al_2Br_5Cl$ |
| --- | --- | --- |
| Aluminum | 11.06 | 11.1 |
| Chlorine | 7.71 | 7.3 |
| Bromine | 80.83 | 81.5 |

*Butane insoluble*

|  | Per Cent Found by Analysis | Per Cent Calculated from Formula $AlBrCl_2$ |
| --- | --- | --- |
| Aluminum | 14.45 | 15.2 |
| Chlorine | 36.21 | 39.9 |
| Bromine | 41.22 | 44.8 |

Experience with solutions of aluminum bromo chloride in butane indicates that at the boiling point of butane the solubility of $Al_2Br_5Cl$ is more than 10 grams of aluminum salt per 100 ml. of liquid butane. However, the difficulty of determining solubilities in boiling liquids makes such determinations of low accuracy. In some instances it has appeared that the solubility has been as high as 16 to 18 grams of the aluminum salt per 100 ml. of butane.

The catalytic solution may be prepared in substantially pure butane or it may be prepared in the residue derived from the polymerization reaction, which usually is a mixture of normal butane and isobutane with smaller amounts of normal butylenes, and sometimes traces to small amounts of propane and propylene. The catalytic solution may contain without harm to solubility or effectiveness, small amounts of pentane or even hexane without harm to the catalytic solution or its reactivity.

The reaction procedure as above pointed out, may be conducted on successive batches of $C_4$ cut or it may be conducted in a continuation process. In either event there remains a substantial residue of unpolymerizable liquid in which the polymer may remain partly or wholly soluble. This residue is easily removed by boiling it away from the higher boiling polymer; either by heating the mixture at atmospheric pressure, or by heating the mixture in a confined container and allowing it to pass through a small opening to yield a jet, from which the volatile portion is very readily vaporized.

The vaporization of the unpolymerized portion of the $C_4$ cut is, of course, preferably conducted in a closed container, and the gaseous residue may be used for fuel, or it may be cooled or compressed and recondensed, a portion being used as solvent for the catalyst or a portion may be used as diluent refrigerant with additional amounts of $C_4$ cut; this latter procedure giving increased overall yields since it increases the percentage of normal butylenes present in the mixture.

The resulting polymer has a more or less wide range of molecular weights, depending in part upon the temperature of polymerization and to some extent upon the catalyst concentration. The small percentage of polymer within the $C_8$ to $C_{16}$ range is readily removed by distillation or by steam reduction. The portion of polymer between about 1500 molecular weight and 6000 molecular weight is readily soluble in liquid propane, whereas the portion having a molecular weight above about 6000 is much less soluble in liquid propane. Accordingly the liquid polymer may be extracted with liquid propane, at about $-40°$ C. under atmospheric pressure; or at higher temperature under elevated pressure. By this procedure a fairly sharp separation of polymer according to molecular weight is obtained, that portion having a molecular weight below about 6000 going into solution in the liquid propane; and that portion having a molecular weight above about 6000 remaining undissolved. The separation is conveniently made by decanting the limpidly fluid butane solution from the viscous unsoluble polymer or by other means which will be apparent to those skilled in the art. The residual polymer is conveniently freed from traces of propane and it then forms an exceedingly effective and satisfactory lubricant addition agent for improving the viscosity and viscosity index of lubricating oils. The dissolved portion of the polymer is conveniently recovered by boiling off the propane; the recovered polymer being very satisfactory and effective for the uses above described.

A further separation of polymer may be obtained by adding to the prepared solution small amounts of an alcohol such as ethyl or propyl alcohols. Small amounts of these alcohols produce a fractional precipitation of the higher molecular weight portions of the polymers dissolved by the propane treatment and it is easy to obtain a series of cuts of varying molecular weight by this procedure.

These polymers are usable for many purposes as produced, or when purified as above described. However, for some purposes they may conveniently be hydrogenated either by a heating treatment with hydrogen or in the presence of a hydrogenation catalyst or by other means which are well known to those skilled in the art.

Another procedure which is of interest for some purposes is a treatment of the polymer with lime or calcium hydroxide, preferably in the presence of steam to remove the lower boiling components. Such a lime treatment with steam is particularly effective for removing the last traces of catalyst.

Thus the process of the invention interpolymerizes isobutylene and normal olefins by the application to a $C_4$ cut of a catalyst in the form of $Al_2Br_5Cl$ to yield a highly valuable interpolymer of a relatively very narrow molecular weight range which is particularly valuable as a thickening agent and viscosity index improving agent in lubricants.

While there are above disclosed but a limited number of embodiments of the process of the invention, it is possible to provide still other embodiments without departing from the inventive concept herein disclosed and it is therefore desired that only such limitations be imposed upon the appended claims as are stated therein or required by the prior art.

The invention claimed is:

1. A polymerization process comprising the steps of mixing together a $C_4$ cut containing isobutylene, normal butylenes, isobutane and normal butane with a hydrocarbon soluble aluminum bromo chloride catalyst having the formula $Al_2ClBr_5$, dissolved in butane and polymerizing the hydrocarbon mixture at a temperature within the range between $+6°$ C. and $-164°$ C. to obtain a copolymer of isobutylene and normal butenes.

2. A polymerization process comprising the steps in combination of dissolving an aluminum bromo chloride having the formula $Al_2ClBr_5$, in butane and mixing the catalyst solution and a $C_4$ cut containing isobutylene, normal butylene and butanes at a temperature within the range between $+6°$ C. and $164°$ C. to polymerize the olefinic material in the $C_4$ cut.

3. A polymerization process comprising the steps in combination of treating a double salt of aluminum with bromine and chlorine having the formula $AlBr_2Cl$ with butane to yield therefrom a butane solution of $Al_2Br_5Cl$ and thereafter mixing the butane solution with a $C_4$ cut comprising isobutylene, normal butylenes, and butanes at a temperature within the range between $+6°$ C. and $164°$ C. to produce an olefinic copolymer of isobutylene and normal butenes.

4. A polymerization process comprising the steps in combination of treating a double salt of aluminum with bromine and chlorine having the formula $AlBr_2Cl$ with butane to yield therefrom a butane solution of $Al_2Br_5Cl$ and thereafter mixing the butane solution with a $C_4$ cut comprising isobutylene, normal butylenes, and butanes, together with a diluent refrigerant comprising propane at a temperature of approximately $-40°$ C., to produce an olefinic copolymer of isobutylene and normal butenes.

5. A polymerization process comprising the steps in combination of treating a double salt of aluminum with bromine and chlorine having the formula $AlBr_2Cl$ with butane to yield therefrom a butane solution of $Al_2Br_5Cl$ and thereafter mixing the butane solution with a $C_4$ cut comprising isobutylene, normal butylenes, and butanes, together with a diluent refrigerant comprising ethane at a temperature of approximately $-88°$ C., to produce a copolymer of isobutylene and normal butenes.

6. A polymerization process comprising the steps in combination of treating a double salt of aluminum with bromine and chlorine having the formula $AlBr_2Cl$ with butane to yield therefrom a butane solution of $Al_2Br_5Cl$ and thereafter mixing the butane solution with a $C_4$ cut comprising isobutylene, normal butylenes, and butanes, together with a diluent refrigerant comprising ethane at a temperature of approximately $-88°$ C. to produce an olefinic copolymer of isobutylene and normal butenes and thereafter volatilizing out unpolymerized material.

7. A polymerization process comprising the steps in combination of treating a double salt of aluminum with bromine and chlorine having the formula $AlBr_2Cl$ with butane to yield therefrom a butane solution of $Al_2Br_5Cl$ and thereafter mixing the butane solution with a $C_4$ cut comprising isobutylene, normal butylenes, and butanes, together with a diluent refrigerant comprising ethane at a temperature of approximately $-88°$ C. to produce a copolymer of isobutylene and normal butenes, decanting a liquid polymer solution from residual catalyst and sludge and volatilizing out unpolymerizable material, and thereafter treating the liquid polymer with decolorizing clay, filtering out the clay and steamstripping the decolorized polymer to remove low boiling components.

8. A polymerization process comprising the steps of mixing together a solution of an aluminum bromo chloride having the formula $Al_2ClBr_5$ in butane and a $C_4$ cut containing isobutylene, normal butylenes, butanes and propane at a temperature of approximately $-40°$ C. to yield a series of polymers of the several olefins and copolymers thereof, part of which remain in solution in the liquid, part of which precipitate as a sludge, decanting off the limpidly liquid portion and volatilizing out propane and unreacted $C_4$ cut components, filtering, clay-treating and steam distilling the sludge to recover polymer portions having molecular weights above about 6000.

9. A polymerization process comprising the steps in combination of dissolving an aluminum bromo chloride having the formula $Al_2ClBr_5$ in the unpolymerizable butane containing residue from polymerization of a $C_4$ cut and adding the solution to a further portion of $C_4$ cut containing isobutylene, normal butylene and butanes together with liquid propane as diluent refrigerant at a temperature of approximately $-40°$ C. to polymerize a major portion of the olefinic material therein.

NORMAN M. ELMORE.
DAVID W. YOUNG.

REFERENCES CITED

The following references are of record in the file of this patent:

UNITED STATES PATENTS

| Number | Name | Date |
|---|---|---|
| 1,798,288 | Weitzel | Mar. 31, 1931 |
| 2,204,157 | Semon | June 11, 1940 |
| 2,224,349 | Holm | Dec. 10, 1940 |
| 2,229,661 | Mann | Jan. 28, 1941 |
| 2,274,031 | Bannon | Feb. 24, 1942 |
| 2,357,676 | Mack | Sept. 5, 1944 |
| 2,393,357 | Fawcett | Jan. 22, 1946 |
| 2,435,229 | Mann | Feb. 3, 1948 |

OTHER REFERENCES

Thomas: "Anhydrous Aluminum Chloride in Organic Chemistry," pages 787-791, Reinhold (1941).

Gmelin-Kruat: "Handbuch der anorganischen Chemie," vol II, part 2, pages 634 and 635, Heidelberg (1909).